(12) United States Patent
Helfer et al.

(10) Patent No.: US 10,564,605 B2
(45) Date of Patent: Feb. 18, 2020

(54) COMPACT BALANCE SPRING OF CONSTANT SECTION

(71) Applicant: ETA SA Manufacture Horlogere Suisse, Grenchen (CH)

(72) Inventors: Jean-Luc Helfer, Le Landeron (CH); Yves-Alain Cosandier, Renens (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 15/287,021

(22) Filed: Oct. 6, 2016

(65) Prior Publication Data

US 2017/0115630 A1    Apr. 27, 2017

(30) Foreign Application Priority Data

Oct. 22, 2015 (EP) ..................................... 15191113

(51) Int. Cl.
*G04B 17/06* (2006.01)
(52) U.S. Cl.
CPC .................................. *G04B 17/063* (2013.01)
(58) Field of Classification Search
CPC .... G04B 17/063; G04B 17/06; G04B 17/066; F16F 1/047
See application file for complete search history.

(56) References Cited

U.S. PATENT DOCUMENTS

| | | | | |
|---|---|---|---|---|
| 7,344,302 B2* | 3/2008 | Musy | ........................ | F16F 1/10 368/175 |
| 8,002,460 B2* | 8/2011 | Daout | ..................... | G04B 17/20 368/175 |
| 8,393,783 B2* | 3/2013 | Daout | ..................... | G04B 17/20 368/175 |
| 8,757,868 B2* | 6/2014 | Karapatis | ............. | G04B 17/066 368/127 |
| 9,348,497 B2* | 5/2016 | Miyano | ............... | G06F 3/04883 |
| 10,012,954 B2* | 7/2018 | Helfer | ................... | G04B 17/063 |
| 2006/0262652 A1* | 11/2006 | Musy | ........................ | F16F 1/10 368/175 |
| 2009/0245030 A1* | 10/2009 | Buhler | ................. | G04B 17/066 368/177 |
| 2010/0027382 A1 | 2/2010 | Daout et al. | | |
| 2010/0149927 A1* | 6/2010 | Zaugg | .................. | G04B 17/066 368/177 |
| 2011/0069591 A1 | 3/2011 | Daout | | |
| 2011/0249537 A1 | 10/2011 | Daout et al. | | |

(Continued)

FOREIGN PATENT DOCUMENTS

EP    2 151 722 A1    2/2010
EP    2 299 336 A2    3/2011

OTHER PUBLICATIONS

European Search Report dated Mar. 24, 2016 in European Application 15191113.8 filed on Oct. 22, 2015 (with English Translation of Categories of cited documents).

*Primary Examiner* — Sean P Kayes
(74) *Attorney, Agent, or Firm* — Oblon, McClelland, Maier & Neustadt, L.L.P.

(57) ABSTRACT

The invention relates to a one-piece balance spring comprising a single strip wound on itself between an inner coil and an outer coil, the strip having a geometry such that when the angle of contraction of the balance spring has a value of 360 degrees, there is a constant distance between each coil from the inner coil to the penultimate coil.

13 Claims, 6 Drawing Sheets

(56) References Cited

U.S. PATENT DOCUMENTS

2011/0310710 A1\* 12/2011 Karapatis ............. G04B 17/066
 368/175
2016/0238994 A1\* 8/2016 Ching .................. G04B 17/066

\* cited by examiner

COMPACT BALANCE SPRING OF CONSTANT SECTION

This application claims priority from European Patent Application No. 15191113.8 filed on Oct. 22, 2015, the entire disclosure of which is hereby incorporated herein by reference.

FIELD OF THE INVENTION

The invention relates to a compact spring and, more particularly, such a spring intended to cooperate with a balance wheel to form a resonator.

BACKGROUND OF THE INVENTION

The cost of a silicon balance spring is substantially proportional to its surface area, i.e. the more balance springs can be etched on the same wafer, the lower the unit cost of the balance spring.

However, it is not possible to randomly decrease dimensions since the coils of a balance spring must not touch each other either in the contracted state or the expanded state.

SUMMARY OF THE INVENTION

It is an object of the present invention to overcome all of part of aforecited drawbacks by proposing a compact balance spring while ensuring that its coils do not touch each other either in the contracted state or the expanded state.

To this end, the invention relates to a one-piece balance spring comprising a single strip wound on itself between an inner coil and an outer coil, the strip comprising, at rest, between the end of the inner coil and the second coil, a first area wherein the pitch decreases, a second area, in the extension of the first area, wherein the pitch between each coil continuously increases such that, when the angle of contraction of the balance spring has a value of 360 degrees, there is a constant distance between each coil from the inner coil to the penultimate coil.

Advantageously according to the invention, it is understood that the balance spring is as compact as possible while ensuring a constant minimum distance between the coils in the contracted state and, possibly also in the expanded state. Therefore, one can attempt to minimise the size of the balance spring without losing timekeeping properties. With such a balance spring, it is possible to optimise the number of balance springs etched on the same wafer in order to reduce the unit cost.

In accordance with other advantageous variants of the invention:
- in the second area, the pitch between each coil continuously increases by a constant value;
- the second area has a constant section;
- the first area has a section that decreases between the end of the inner coil and the junction thereof with the second area;
- the first area has an identical section to that of the second area;
- the balance spring includes a third area, in the extension of the second area and comprised between the start of the penultimate coil and the end of the outer coil, wherein the pitch continuously increases such that when the angle of expansion of the balance spring has a value of 360 degrees, there is a minimum distance between the penultimate coil and the outer coil to prevent any contact there between;
- in the third area, the pitch continuously increases by a constant value;
- the third area includes a first portion whose section is substantial to that of the second area, and a second portion, in the extension of the first portion, whose section increases as it approaches the end of the outer coil;
- the third area includes a first portion whose section is substantially identical to that of the second area, and a second portion, in the extension of the first portion, whose section is increased with respect to that of the second area and constant to the end of the outer coil;
- the balance spring is silicon-based.

Moreover, the invention relates to a resonator wherein it includes a balance cooperating with a balance spring according to any of the preceding variants.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

The invention relates to a compact balance spring intended to cooperate with a balance to form a sprung-balance type resonator for timepieces. Of course, the balance spring may include a collet integral with the end of the inner coil and/or a stud attachment integral with the end of the outer coil without departing from the scope of the invention. However, for the sake of simplicity of the description, no collet and/or attachment is illustrated.

The development of the present invention was initiated to produce a maximum number of balance springs on the same silicon-based wafer while ensuring that the coils of each balance spring do not touch each other either in the contracted state or the expanded state. However, it is understood that the balance spring is not limited to a silicon-based material. In a non-limiting manner, it is understood that the same logic is applicable to a balance spring formed from a LIGA method, i.e. using an electrically conductive material.

The term "silicon-based" means a material including single crystal silicon, doped single crystal silicon, polycrystalline silicon, doped polycrystalline silicon, porous silicon, silicon oxide, quartz, silica, silicon nitride or silicon carbide. Of course, when the silicon-based material is in crystalline phase, any crystalline orientation may be used.

Figure 2:
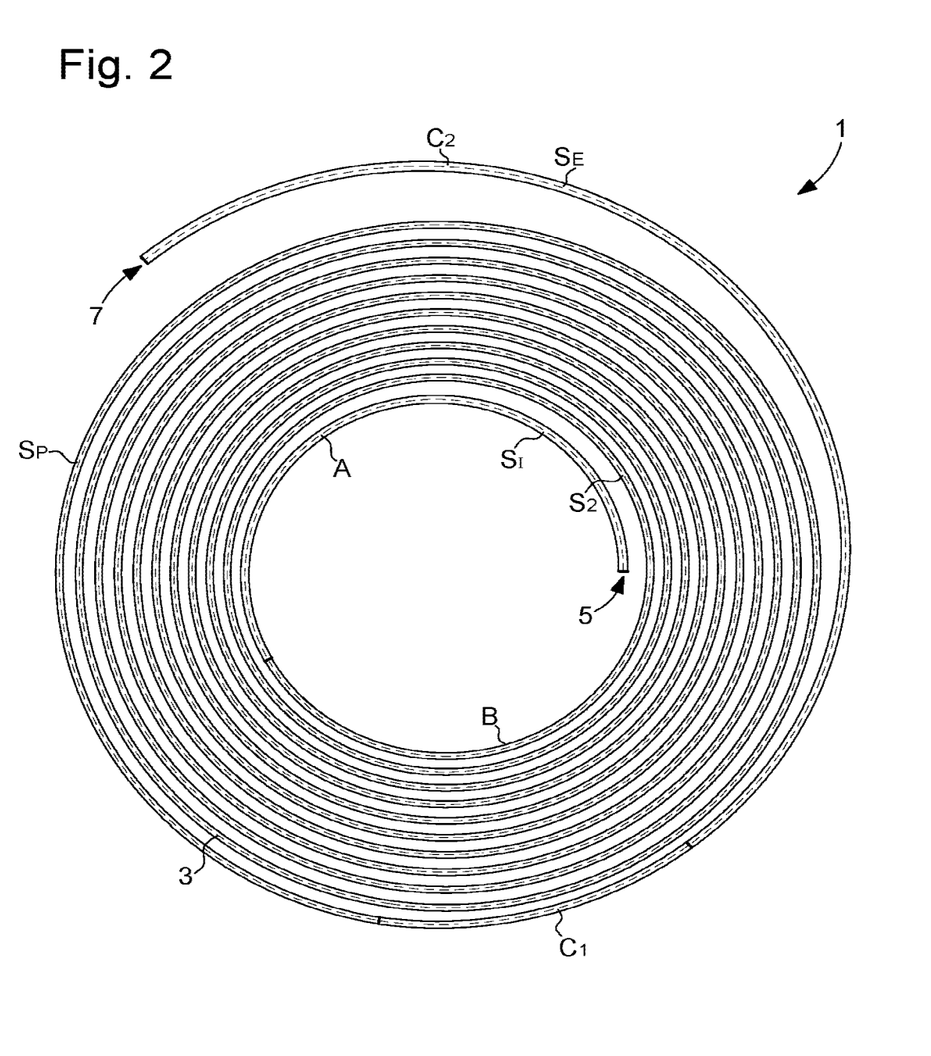
FIG. 2 is a top view of a balance spring according to the invention in the rest position.

As illustrated in FIG. 2, the invention therefore relates to a one-piece balance spring 1 comprising a single strip 3 wound on itself between an inner coil $S_I$ and an outer coil $S_E$. According to the invention, strip 3 of balance spring 1, in the rest position illustrated in FIG. 2, comprises between end 5 of inner coil $S_I$ and the start of second coil $S_2$, a first area A wherein the pitch between inner coil $S_I$ and second coil $S_2$ decreases.

Figure 1:
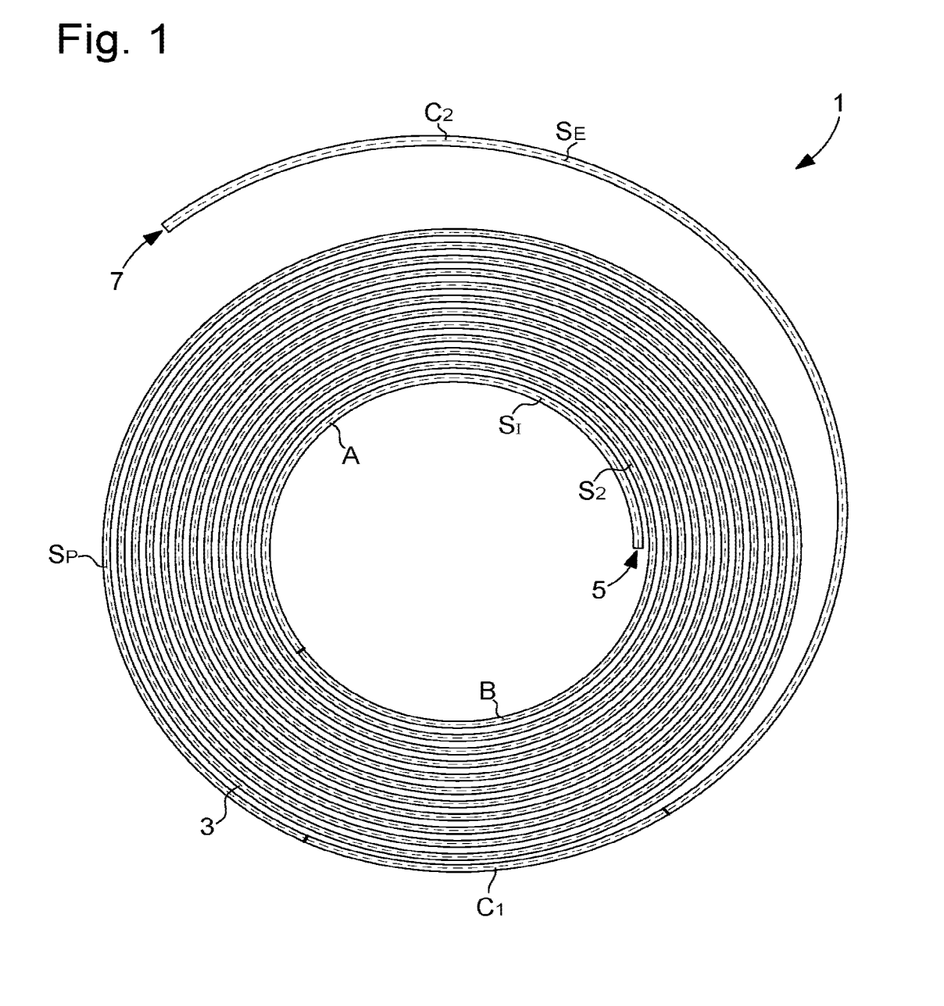
FIG. 1 is a top view of a balance spring according to the invention in a contracted state.

Advantageously, balance spring 1 comprises, in the extension of first area A, a second area B, wherein the pitch between each coil continuously increases, such that when balance spring 1 is contracted, i.e. when end 5 of inner coil $S_I$ has effected a rotation of substantially −360 degrees with respect to the centre of balance spring 1, as seen in FIG. 1, there is a substantially constant distance between each coil from inner coil $S_I$ to penultimate coil $S_P$.

Figure 4:
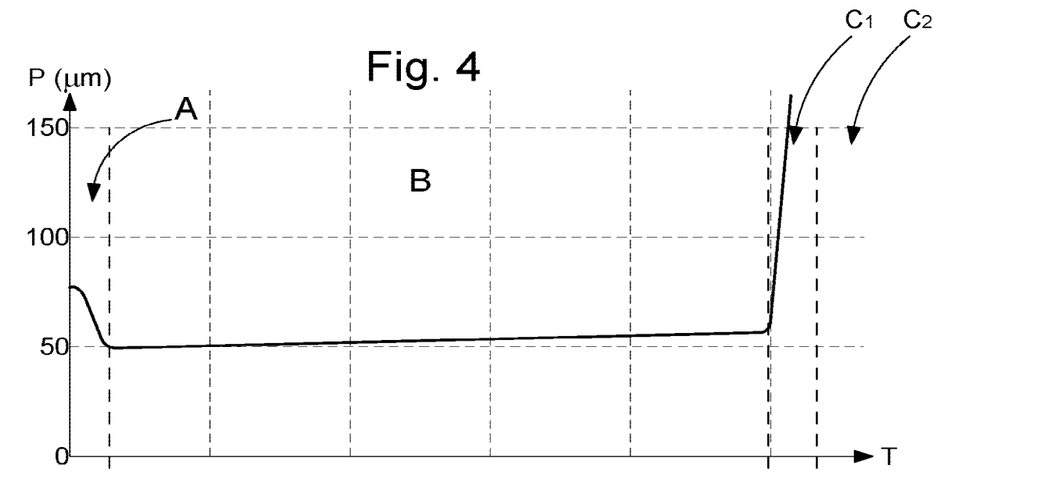
FIG. 4 is a graph showing the change of pitch between the coils as a function of the number of coils of the balance spring.

Preferably, as illustrated in FIG. 4, the pitch between each coil continuously increases by a substantially constant value in second area B. Further, preferably according to the invention, second area B has a constant section. Thus, for example, the constant section may have a constant thickness comprised between 10 and 50 µm and a constant height comprised between 50 µm and 250 µm.

Figure 3:
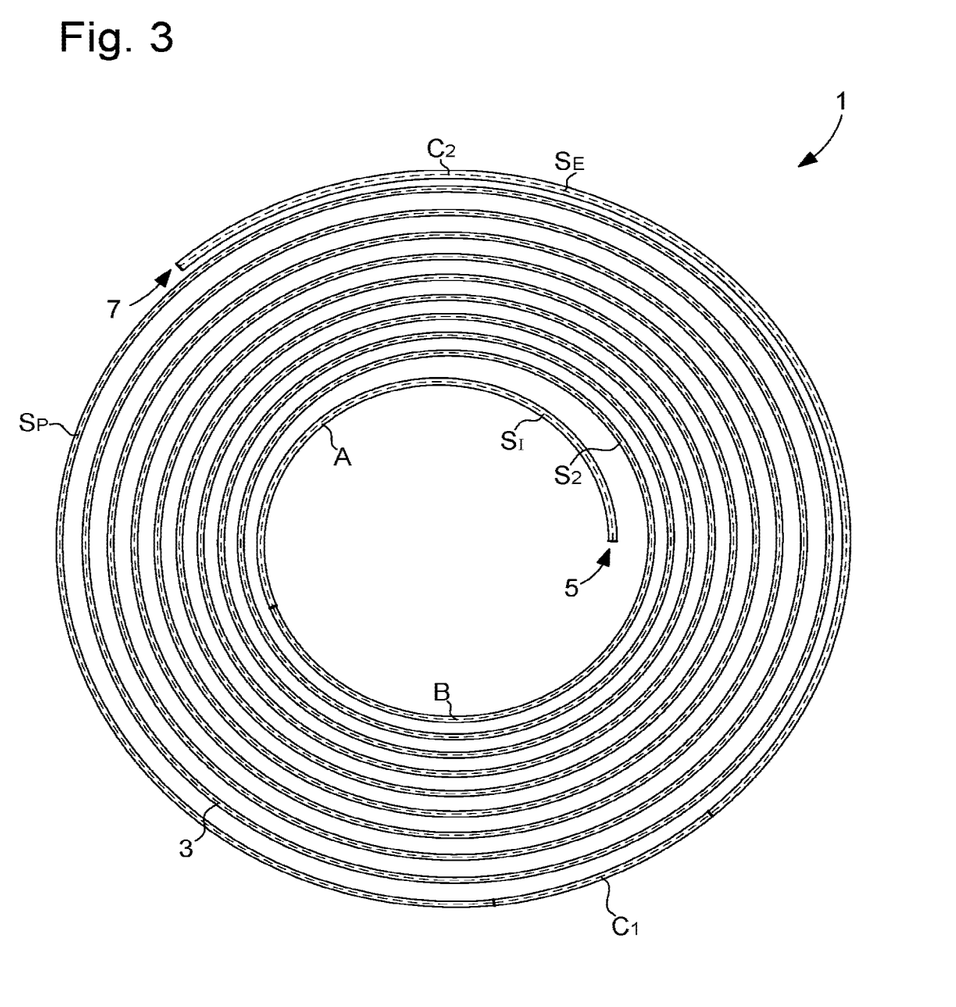
FIG. 3 is a top view of a balance spring according to the invention in an expanded state.

According to an additional optional feature, advantageously according to the invention, the balance spring comprises a third area C, in the extension of second area B and comprised between the start of penultimate coil $S_P$ and end 7 of outer coil $S_E$, wherein the pitch, between penultimate coil $S_P$ and outer coil $S_E$, continuously increases such that when balance spring 1 is expanded, i.e. when end 5 of inner coil $S_I$ has effected a rotation of substantially +360 degrees with respect to the centre of balance spring 1, as seen in FIG. 3, there is a minimum distance between penultimate coil $S_P$ and outer coil $S_E$ to prevent contact, in particular between penultimate coil $S_P$ and outer coil $S_E$.

Preferably, as illustrated in FIG. 4, the pitch between each coil continuously increases by a second substantially constant value in third area C. As seen in FIG. 4, the second substantially constant value is preferably greater than the first substantially constant value of second area B. Further, preferably according to the invention, third area C includes a first portion $C_1$ with a substantially identical thickness to that of second area B, then a second portion $C_2$ in which the thickness continuously increases.

A first graph showing the change in pitch P between the coils as a function of the number of coils of the balance spring is illustrated in FIG. 4. It can be seen that in first area A of balance spring 1, the pitch decreases in a substantially constant manner up to the start of second area B. In FIG. 4 it can be seen that second area B has a substantially constant increase in pitch up to third area C. Area C has a substantially constant increase in pitch up to end 7 of outer coil $S_E$. As seen in FIG. 4, the substantially constant pitch increase in third area C is much more pronounced than that in area B.

Figure 5:
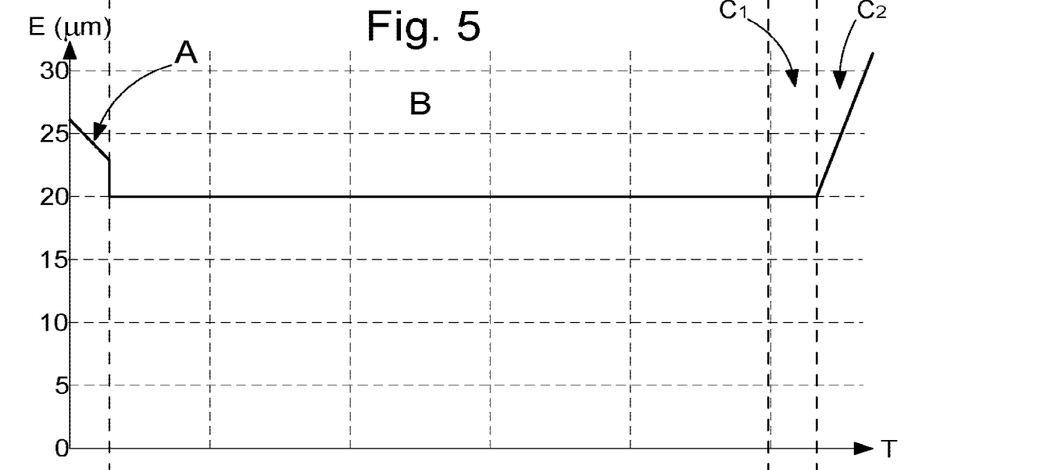
FIG. 5 is a graph showing the change in thickness of the coils as a function of the number of coils of the balance spring.

In a complementary manner, a second graph showing the change in thickness E of the coils as a function of the number of coils of the balance spring is illustrated in FIG. 5. It can be seen that, in first area A of balance spring 1, the thickness decreases up to the start of second area B. In FIG. 5, it can be seen that second area B has a constant thickness up to third area C. Area C has a first portion $C_1$ whose thickness remains constant and a second portion $C_2$ in the extension of first portion $C_1$, whose thickness increases towards end 7 of outer coil $S_E$.

Figure 6:
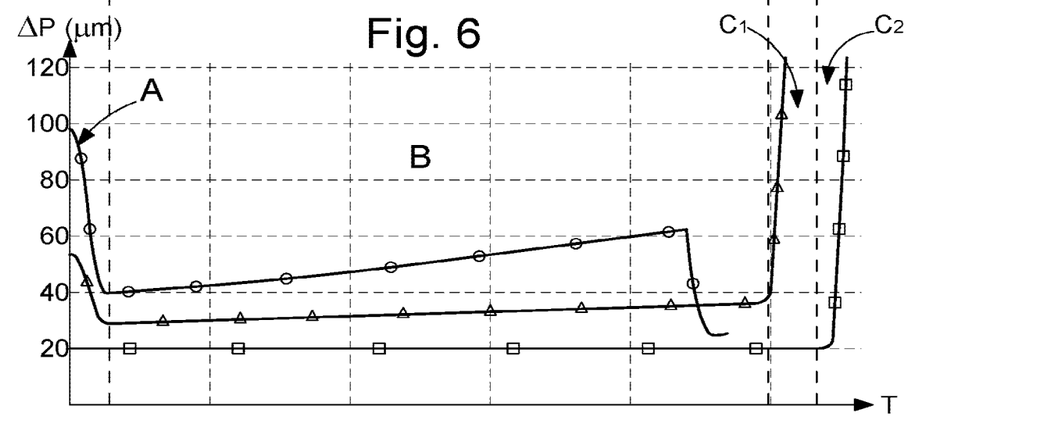
FIG. 6 is a graph showing the change in distance between the coils as a function of the number of coils of the balance spring and of the state of the balance spring.

Finally, a graph showing the change ΔP in distance between the coils as a function of the number of coils of the balance spring is illustrated in FIG. 6. More specifically, the distance ΔP between the coils is illustrated for the balance spring in its contracted state represented in FIG. 1 (curve marked with a square □), in its rest state represented in FIG. 2 (curve marked with a triangle Δ) and, in its expanded state represented in FIG. 3 (curve marked with a circle ○).

Consequently, in the expanded state marked with a circle (○), it can be seen that, in first area A of balance spring 1, the distance ΔP between the coils decreases up to the start of second area B. It is noted, thereafter, that in second and third areas B and C, the distance ΔP between the coils continuously increases until the fixed point of attachment to the stud of end 7 returns the distance between the coils to a minimum value.

This is logical, since in its rest state, the curve marked with a triangle (Δ) in FIG. 6 is identical to the curve of FIG. 4. Finally, in the contracted state marked with a square (□), it can be seen that, in first and second areas A and B of balance spring 1, the distance ΔP between the coils is substantially constant and equal to a minimum value. It is then noted that, in third area C there is a continuous increase in distance ΔP between the coils towards end 7 of outer coil $S_E$.

In FIG. 6, it is noted that the minimum values of the curves with a circle (○) and a square (□) are not identical. However, they could be made geometrically identical.

Similarly, the values described in FIGS. 4 to 6 are used merely as examples. Depending on the configurations of the balance spring and/or of the resonator to which it belongs, the minimum value chosen could be different from the 20 µm chosen as an example in FIG. 6. It is therefore clear that the minimum value of the curves with a circle (○) and a square (□) could each be chosen to be less than or greater than 20 µm.

Advantageously according to the invention, it is understood, however, that these particular features of balance spring 1 allow the spring maximum compactness at rest while guaranteeing a constant minimum distance between the coils in the contracted state and, possibly, also in the expanded state. Typically, balance spring 1 at rest has 11.4 coils in a maximum radius of approximately 1.2 millimetres, i.e. the distance between the geometric centre of balance spring 1 and end 7 of outer coil $S_E$. For the sake of completeness, the study revealed that the distance between the geometric centre of balance spring 1 and end 5 of inner coil $S_E$ was approximately 0.5 millimetres. The size of the balance spring can therefore be minimised without thereby losing timekeeping properties. With the balance spring of the invention it is possible to optimise the number of balance springs etched on the same wafer in order to reduce the unit cost.

Of course, the present invention is not limited to the illustrated example but is capable of various variants and modifications that will appear to those skilled in the art. In particular, the geometry, i.e. the variations in pitch and section, such as for example the thickness and number of coils, may vary depending on the envisaged applications.

Figure 7:
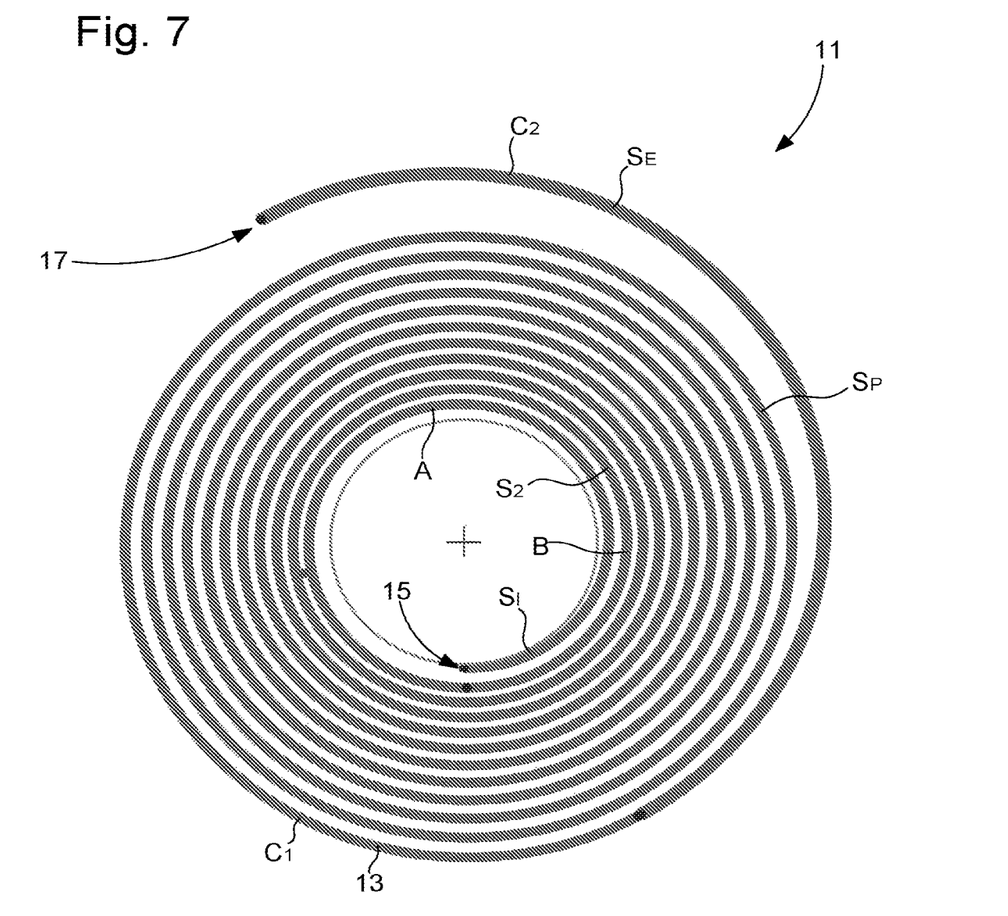
FIG. 7 is a top view of the rest position of an alternative of the balance spring according to the invention.

By way of example, an alternative to FIG. 2 is illustrated in FIG. 7. The alternative of the invention therefore relates to a one-piece balance spring 11 comprising a single strip 13 wound on itself between an inner coil $S_I$ and an outer coil $S_E$. According to the invention, strip 13 of balance spring 11, in the rest position illustrated in FIG. 7, comprises between end 15 of inner coil $S_I$ and the start of second coil $S_2$, a first area A wherein the pitch between inner coil $S_I$ and second coil $S_2$ decreases.

Advantageously, balance spring 11 comprises, in the extension of first area A, a second area B, wherein the pitch between each coil continuously increases, such that when balance spring 11 is contracted, i.e. when end 15 of inner coil $S_I$ has effected a rotation of substantially −360 degrees with respect to the centre of balance spring 11, as with balance spring 1, there is a substantially constant distance between each coil from inner coil $S_I$ to penultimate coil $S_P$.

Figure 8:
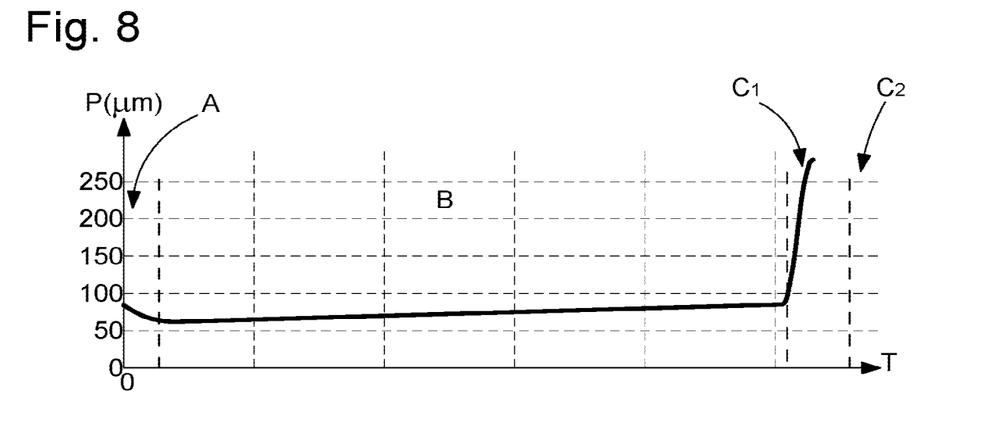
FIG. 8 is a graph showing the change of pitch between the coils as a function of the number of coils of an alternative of the balance spring.

Preferably, as illustrated in FIG. 8, the pitch between each coil continuously increases by a substantially constant value in second area B. Further, preferably according to the alternative, second area B has a constant section. Thus, for example, the constant section may have a constant thickness comprised between 10 and 50 μm and a constant height comprised between 50 μm and 250 μm.

According to an additional optional feature, advantageously according to the invention, balance spring 11 comprises a third area C, in the extension of second area B and comprised between the start of penultimate coil $S_P$ and end 17 of outer coil $S_E$, wherein the pitch, between penultimate coil $S_P$ and outer coil $S_E$, continuously increases such that when balance spring 11 is expanded, i.e. when end 15 of inner coil $S_I$ has effected a rotation of substantially +360 degrees with respect to the centre of balance spring 11, as with balance spring 1, there is a minimum distance between penultimate coil $S_P$ and outer coil $S_E$ to prevent contact, in particular between penultimate coil $S_P$ and outer coil $S_E$.

Preferably, as illustrated in FIG. 8, the pitch between each coil continuously increases by a second substantially constant value in third area C. As seen in FIG. 8, the second substantially constant value is preferably greater than the first substantially constant value of second area B. Further, preferably according to the invention, third area C includes a first portion $C_1$ with a substantially identical thickness to that of second area B, then a second portion $C_2$ in which the thickness is increased with respect to area B and constant up to the end 17 of outer coil $S_E$.

A first graph showing the change in pitch P between the coils as a function of the number of coils of balance spring 11 is illustrated in FIG. 8. It can be seen that in first area A of balance spring 11, the pitch decreases up to the start of second area B. In FIG. 8, it can be seen that second area B has a substantially constant increase in pitch up to third area C. Area C has a substantially constant increase in pitch up to end 17 of outer coil $S_E$. As seen in FIG. 8, the substantially constant pitch increase in third area C is much more pronounced than that in area B.

Figure 9:
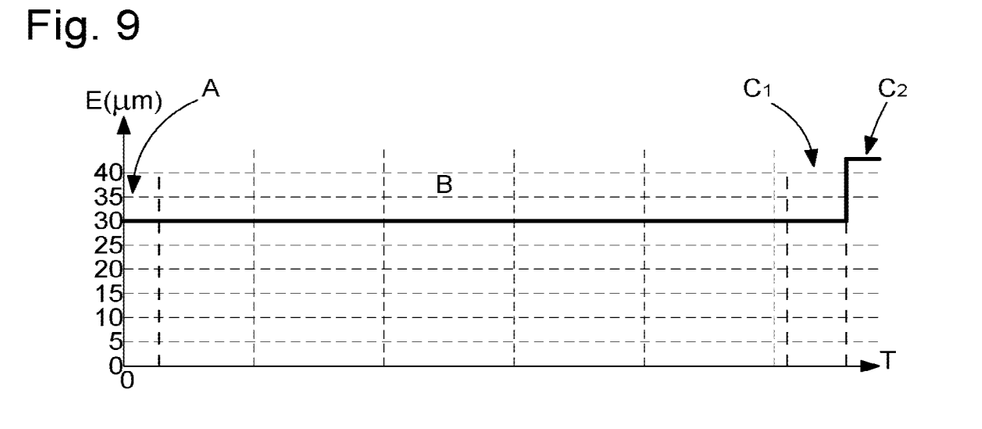
FIG. 9 is a graph showing the change in thickness of the coils as a function of the number of coils of an alternative of the balance spring.

In a complementary manner, a second graph showing the change in thickness E of the coils as a function of the number of coils of balance spring 11 is illustrated in FIG. 9. It can be seen that, in first area A and second area B, balance spring 11 has a constant thickness up to third area C. Area C includes a first portion $C_1$ whose section is substantially identical to that of first and second areas A, B, and a second portion $C_2$, in the extension of first portion $C_1$, whose section is increased with respect to that of second area B and constant up to end 17 of outer coil $S_E$.

Figure 10:
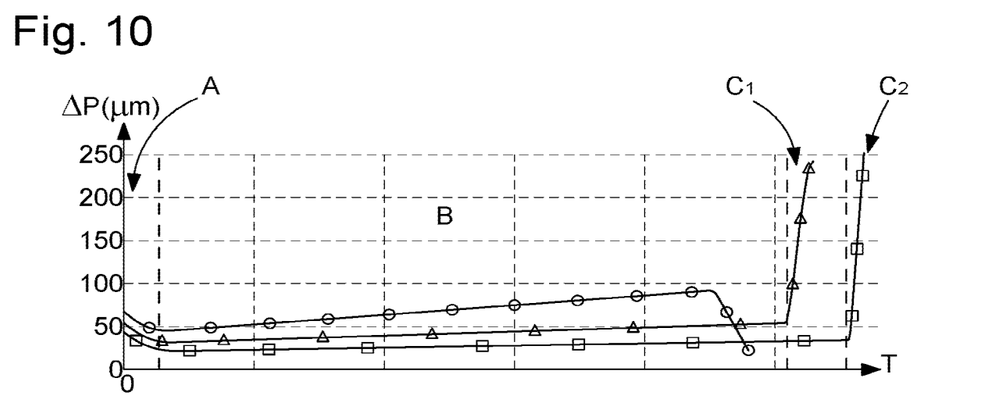
FIG. 10 is a graph showing the change in distance between the coils as a function of the number of coils of the balance spring and of the state of an alternative of the balance spring.

Finally, a graph showing the change ΔP in distance between the coils as a function of the number of coils of balance spring 11 is illustrated in FIG. 10. More specifically, the distance ΔP between coils is illustrated for balance spring 11 in its contracted state (curve marked with a square □), in its rest state of the FIG. 7 (curve marked with a triangle Δ) and, in its expanded state (curve marked with a circle ○).

Consequently, in the expanded state marked with a circle (○), it can be seen that, in first area A of balance spring 11, the distance ΔP between the coils decreases up to the start of second area B. It is noted, thereafter, that in second and third areas B and C, the distance ΔP between the coils continuously increases until the fixed point of attachment to the stud of end 17 returns the distance between the coils to a minimum value.

This is logical, since in its rest state, the curve marked with a triangle (Δ) in FIG. 10 is identical to the curve of FIG. 8. Finally, in the contracted state marked with a square (□), it can be seen that, in first area A of balance spring 11, the distance ΔP between the coils decreases up to the start of second area B. Then, in second area B of balance spring 11, distance ΔP between the coils is advantageously constant and equal to a minimum value. It is then noted that, in third area C there is a continuous increase in distance ΔP between the coils towards end 17 of outer coil $S_E$.

In FIG. 10, it is noted that the minimum values of the curves with a circle (○) and a square (□) are not identical. However, they could be made geometrically identical.

Similarly, the values described in FIGS. 8 to 10 are used merely as examples. Depending on the configurations of the balance spring and/or of the resonator to which it belongs, the minimum value chosen could be different from the 20 μm chosen as an example in FIG. 10. It is therefore clear that the minimum value of the curves with a circle (○) and a square (□) could each be chosen to be less than or greater than 20 μm.

Advantageously according to the invention, it is understood, however, that these particular features of balance spring 11 allow the spring maximum compactness at rest while guaranteeing a substantially constant minimum distance between the coils in the contracted state and, possibly, also in the expanded state. Typically, balance spring 11 at rest has 11.6 coils in a maximum radius of approximately 1.6 millimetres, i.e. the distance between the geometric centre of balance spring 11 and end 17 of outer coil $S_E$. For the sake of completeness, the study revealed that the distance between the geometric centre of balance spring 11 and end 15 of inner coil $S_E$ was approximately 0.5 millimetres. The size of the balance spring can therefore be minimised without thereby losing timekeeping properties. With the balance spring of the invention it is possible to optimise the number of balance springs etched on the same wafer in order to reduce the unit cost.

Moreover, in addition, the number of coils could be reduced to still further decrease the size of balance spring 1, 11.

It is also clear that the 360° angle of contraction of or expansion could be smaller without departing from the scope of the invention Indeed, this angle was chosen because mechanically the angle cannot theoretically be exceeded. However, the important point is not the angle at which the distance is minimum, but rather to ensure that the minimum distance is never exceeded. It is therefore understood that the angle could deliberately be chosen to be lower since, depending on the configuration of the movement, it is clear that this angle will not be exceeded in normal operation.

Further, the ordinate values in FIG. 4 are non-limiting. Thus, depending on the section of second area B, the maximum pitch of first area A and/or of third area C may vary. It is therefore clear that only the pitch variations are retained, but not necessarily with the same minimum and/or maximum values.

Similarly, the ordinate values in FIG. 5 are non-limiting. Thus, depending on the thickness of second area B, the maximum thickness of first area A and/or of third area C may vary. It is thus understood that only the thickness variations are retained, but not necessarily with the same minimum and/or maximum values.

It is also possible to combine the examples of FIGS. 2 and 7 without departing from the scope of the invention. By way of example, it could thus be envisaged to develop a balance spring with areas A & B of FIG. 2 and an area C of FIG. 7, or a balance spring with areas B & C of FIG. 2 and an area A of FIG. 7.

Finally, although the calculations were based on variation in thickness, it is clear that the variation must be understood as a variation in section, i.e. in the height and/or in the thickness of the strip of the balance spring.

What is claimed:

1. A one-piece balance spring comprising:
    only a single strip that includes a plurality of loops wound on itself, the single strip being wound between an inner coil loop of the single strip and an outer coil loop of the single strip, each coil loop of the single strip is immediately adjacent to a next coil loop of the single strip from the inner coil loop of the single strip to a penultimate coil loop of the single strip, wherein the single strip further includes
    a first area between an end of the inner coil loop of the single strip and a start of the second coil loop of the single strip, wherein a pitch decreases in the first area, and
    a second area in an extension of the first area, wherein, in the second area, the pitch between each coil loop of the single strip continuously increases, and each coil loop of the single strip from the inner coil loop of the single strip to the penultimate coil loop of the single strip has a constant distance between each coil loop of the single strip when an angle of contraction of the balance spring has a value of 360 degrees.

2. The one-piece balance spring according to claim 1, wherein, in the second area, the pitch between each coil loop of the single strip continuously increases by a first constant value.

3. The one-piece balance spring according to claim 1, wherein the second area has a constant section.

4. The one-piece balance spring according to claim 3, wherein the constant section has a constant thickness comprised between 10 µm and 50 µm and a constant height comprised between 50 µm and 250 µm.

5. The one-piece balance spring according to claim 1, wherein a thickness the first area and the second area are identical.

6. The one-piece balance spring according to claim 1, wherein the balance spring is silicon-based.

7. A resonator wherein the resonator includes a balance cooperating with the one-piece balance spring according to claim 1.

8. The one-piece balance spring according to claim 1, wherein a distance between each coil loop of the single strip decreases in the first area.

9. A one-piece balance spring comprising:
    only a single strip that includes a plurality of loops wound on itself, the single strip being wound between an inner coil loop of the single strip and an outer coil loop of the single strip, each coil loop of the single strip is immediately adjacent to a next coil loop of the single strip from the inner coil loop of the single strip to a penultimate coil loop of the single strip, wherein the single strip further includes
    a first area between an end of the inner coil loop of the single strip and a start of the second coil loop of the single strip, wherein a pitch decreases in the first area,
    a second area in an extension of the first area, wherein, in the second area, the pitch between each coil loop of the single strip continuously increases, and each coil loop of the single strip from the inner coil loop of the single strip to the penultimate coil loop of the single strip has a constant distance between each coil loop of the single strip when an angle of contraction of the balance spring has a value of 360 degrees, and
    a third area, in an extension of the second area and comprised between a start of the penultimate coil loop of the single strip and an end of the outer coil loop of the single strip, wherein the pitch between the penultimate coil loop of the single strip and the outer coil loop of the single strip continuously increases in the third area.

10. The one-piece balance spring according to claim 9, wherein, the Ditch between each coil loop of the single strip continuously increases by a first constant value in the second area and the pitch between each coil loop of the single strip continuously increases by a second constant value in the third area, the second constant value being greater than the first constant value.

11. The one-piece balance spring according to claim 9, wherein the third area includes a first portion and a second portion in an extension of the first portion, wherein a thickness of the first portion and the second area are substantially identical, and the thickness of the second portion increases towards the end of the outer coil loop of the single strip.

12. The one-piece balance spring according to claim 9, wherein the third area includes a first portion and a second portion in an extension of the first portion, wherein a thickness of the first portion and the second area are substantially identical, and the thickness of the second portion increases with respect to the thickness of the second area and constant up to the end of the outer coil loop of the single strip.

13. The one-piece balance spring according to claim 9, wherein each coil loop of the single strip having a minimum distance between the penultimate coil loop of the single strip and the outer coil loop of the single strip when an angle of expansion of the balance spring has a value of 360 degrees, each coil loop of the single strip is not in contact with the next coil loop of the single strip.

* * * * *